United States Patent
Kim

(10) Patent No.: US 10,635,277 B2
(45) Date of Patent: Apr. 28, 2020

(54) DYNAMICALLY SELECTING STORED CONTENT FOR DISPLAY BASED ON REAL-TIME PARAMETERS CALCULATED FOR OPERATIONS PERFORMED ON IMAGE DATA DISPLAYED BY AN ELECTRONIC DEVICE

(71) Applicant: RAKUTEN, INC., Tokyo (JP)

(72) Inventor: Jinyong Kim, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 349 days.

(21) Appl. No.: 15/469,030

(22) Filed: Mar. 24, 2017

(65) Prior Publication Data
US 2017/0277415 A1   Sep. 28, 2017

(30) Foreign Application Priority Data

Mar. 24, 2016 (WO) .................. PCT/JP2016/059405
Jan. 6, 2017 (JP) ................................. 2017-001327

(51) Int. Cl.
*G06F 3/0484* (2013.01)
*G06F 40/103* (2020.01)
(Continued)

(52) U.S. Cl.
CPC ........ *G06F 3/04845* (2013.01); *G06F 3/0482* (2013.01); *G06F 3/0485* (2013.01);
(Continued)

(58) Field of Classification Search
CPC .... G06F 16/345; G06F 17/21; G06F 17/2229; G06F 3/0485; G06F 3/04845; G06F 3/0482; G06F 3/04847; G06F 17/211
See application file for complete search history.

(56) References Cited

U.S. PATENT DOCUMENTS 6,944,830 B2 * 9/2005 Card .................. G06F 16/954
                                                              715/853
9,767,479 B2 * 9/2017 Filev .................. G06Q 30/02
(Continued)

FOREIGN PATENT DOCUMENTS

JP    2002/149152 A    5/2002
JP    2009/182803 A    8/2009
(Continued)

OTHER PUBLICATIONS

International Search Report and Written Opinion issued in PCT/JP2016/059405 (dated May 31, 2016).
(Continued)

*Primary Examiner* — Kieu D Vu
*Assistant Examiner* — Blaine T. Basom
(74) *Attorney, Agent, or Firm* — Xsensus LLP

(57) ABSTRACT

An information processing system that calculates an estimated display duration for which a content item will be displayed on a page displayed by a display of an electronic device; determines an amount of content to be included in the content item, wherein the determining includes reducing an amount of content included in the content item in a case that the estimated display duration is less than a predetermined threshold value; and causes the content item to be displayed on the page displayed by the display of the electronic device based on the determining.

16 Claims, 6 Drawing Sheets

TARGET CONTENT ITEM

DISPLAY DURATION:
10 SECONDS OR MORE

(51) Int. Cl.
*G06F 16/34* (2019.01)
*G06F 3/0482* (2013.01)
*G06F 3/0485* (2013.01)

(52) U.S. Cl.
CPC ........ *G06F 3/04847* (2013.01); *G06F 16/345* (2019.01); *G06F 40/103* (2020.01)

(56) References Cited

U.S. PATENT DOCUMENTS

| | | | |
|---|---|---|---|
| 10,198,748 B2* | 2/2019 | Shahraray | G11B 27/034 |
| 2002/0057281 A1 | 5/2002 | Moroo et al. | |
| 2002/0109709 A1 | 8/2002 | Sagar | |
| 2009/0007007 A1 | 1/2009 | Voros et al. | |
| 2009/0196575 A1 | 8/2009 | Masuo | |
| 2010/0063885 A1* | 3/2010 | Merkin | G06Q 30/02 |
| | | | 705/14.68 |
| 2011/0202869 A1* | 8/2011 | Sung | G06F 3/04855 |
| | | | 715/784 |
| 2012/0139952 A1* | 6/2012 | Imai | G09G 5/34 |
| | | | 345/672 |
| 2012/0197630 A1* | 8/2012 | Lyons | G06F 16/345 |
| | | | 704/9 |
| 2012/0218310 A1 | 8/2012 | Shinohara | |
| 2014/0317484 A1 | 10/2014 | Abe | |
| 2015/0089358 A1* | 3/2015 | Li | G06F 3/0485 |
| | | | 715/273 |
| 2015/0206535 A1* | 7/2015 | Iwai | G10L 15/25 |
| | | | 704/231 |
| 2015/0234561 A1 | 8/2015 | Kashima et al. | |

FOREIGN PATENT DOCUMENTS

| | | |
|---|---|---|
| JP | 2012-174249 A | 9/2012 |
| JP | 2013-232127 A | 11/2013 |
| JP | 2014/157507 A | 8/2014 |
| WO | WO 2009/107973 A2 | 9/2009 |
| WO | WO 2014/188496 A | 11/2014 |

OTHER PUBLICATIONS

Japanese Office Action in JP Application JP2017-001327 dated Mar. 14, 2017.

* cited by examiner

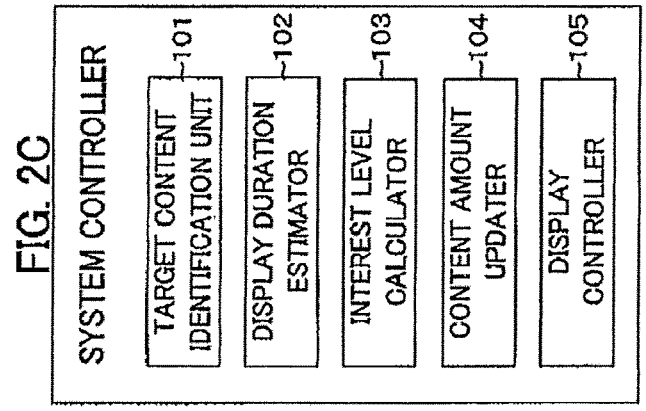
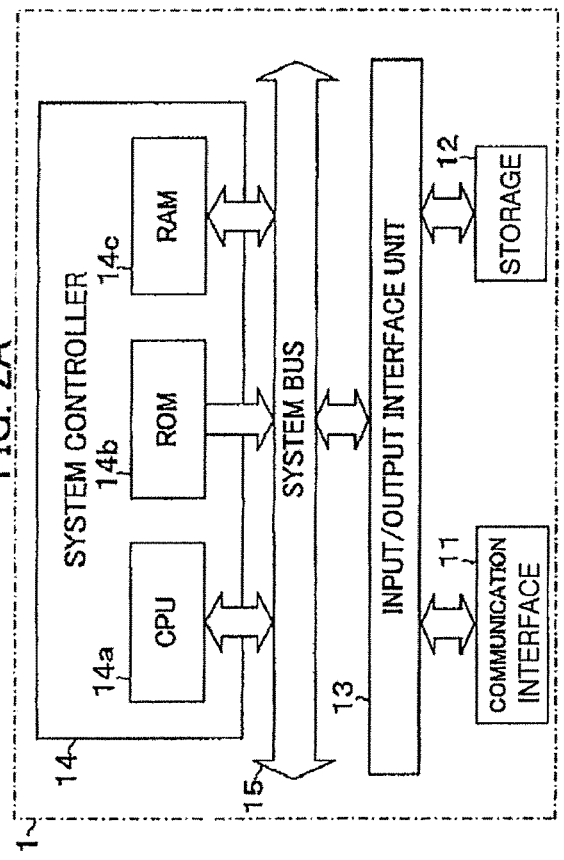
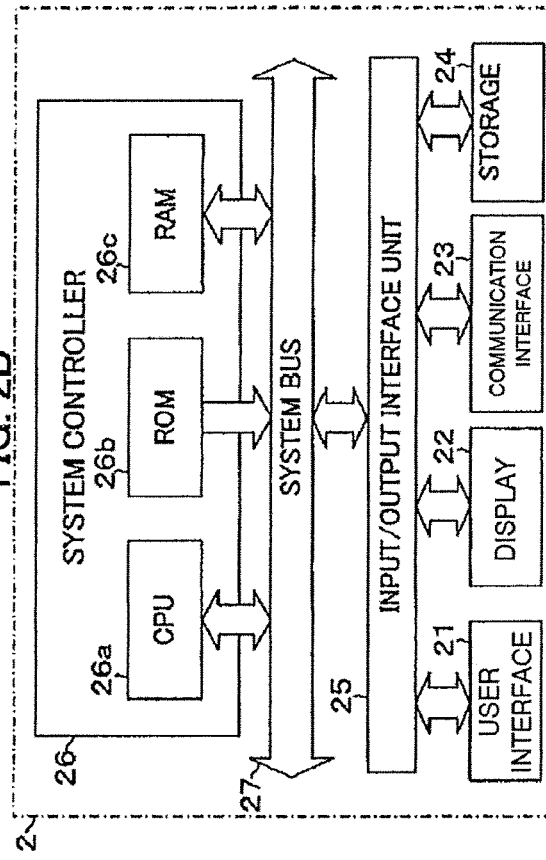

TARGET CONTENT ITEM
DISPLAY DURATION:
10 SECONDS OR MORE

DISPLAY DURATION:
5 SECONDS OR MORE,
BUT LESS THAN 10 SECONDS

DISPLAY DURATION:
1 SECOND OR MORE,
BUT LESS THAN 5 SECONDS

DISPLAY DURATION:
LESS THAN 1 SECOND

DISPLAY EXAMPLE FOR ESTIMATED DISPLAY DURATION OF 6 SECONDS

DISPLAY EXAMPLE FOR ESTIMATED DISPLAY DURATION OF 0.8 SECONDS

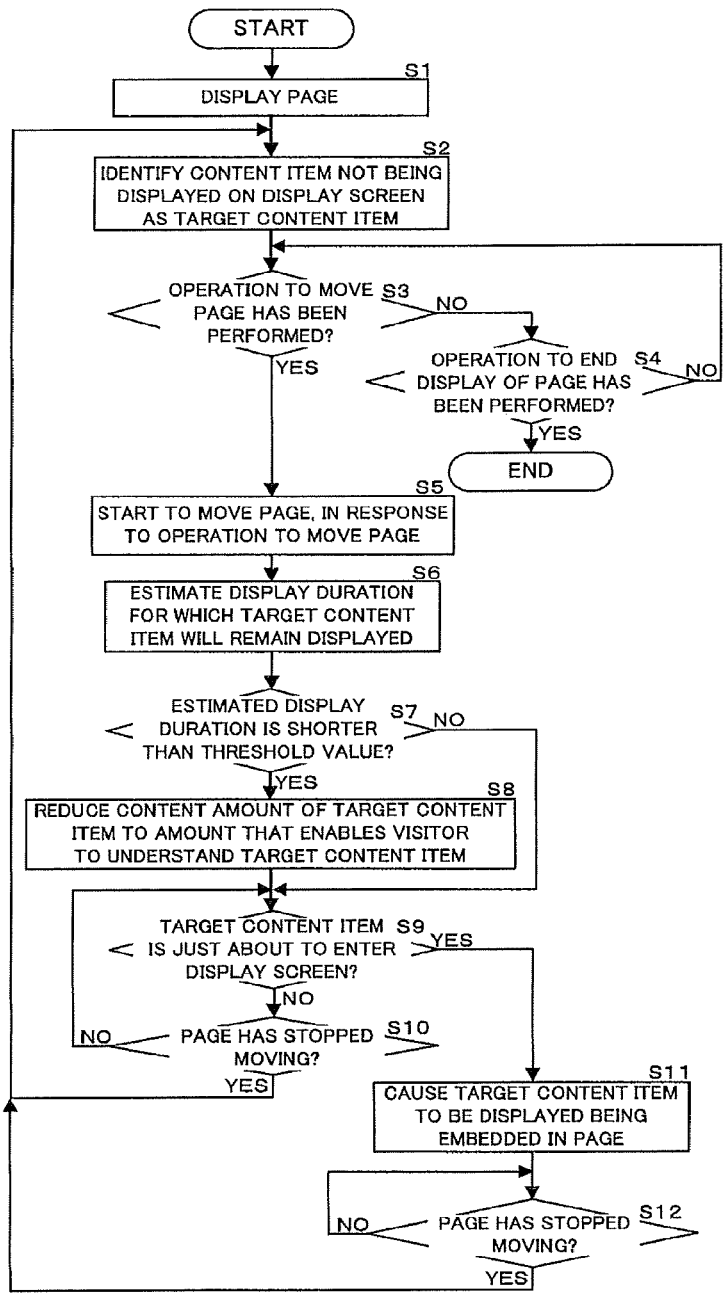

DYNAMICALLY SELECTING STORED CONTENT FOR DISPLAY BASED ON REAL-TIME PARAMETERS CALCULATED FOR OPERATIONS PERFORMED ON IMAGE DATA DISPLAYED BY AN ELECTRONIC DEVICE

TECHNICAL FIELD

The present invention relates to techniques for dynamically selecting image data to be displayed at an interface of an electronic device.

BACKGROUND

As conventionally known, some content information providing systems can display content items (e.g., item information, blogs, or articles), which are provided by an application, in a manner appropriate to each situation. Patent Literature 1 discloses a technique for automatically displaying content items at the best scale factor for the display size of a display screen. Patent Literature 2 discloses a technique for adjusting the playback speed of a content item, based on the frame information amount of the content item.

These known content information providing systems may also include a number of content items to be displayed on a display screen. Due to limitations in bandwidth and processing speeds, there may be a delay in providing this content from the content information providing system to a terminal accessing the content because of the time necessary to provide the content to the terminal. In such a system a user may quickly change the display (e.g. by a scrolling or page turning operation) before the content has been provided to the terminal for display to the user.

CITATION LIST

Patent Literature

Patent Literature 1: JP 2002-149152 A
Patent Literature 2: JP 2009-182803 A

SUMMARY OF INVENTION

Technical Problem

The technique disclosed in Patent Literature 1 enables characters to be displayed with a font size appropriate to the display size of the display screen. However, display of a content item cannot be controlled so that a visitor can understand the display content of the content item even when the content item remains displayed for a short period of time. The technique disclosed in Patent Literature 2 enables the playback speed of a content item to be adjusted based on the information amount of the content item. However, display of a content item cannot be controlled so that a visitor can understand the display content of the content item even when the content item remains displayed for a short period of time.

Solution to Problem

In view of the above and other points, it is an object of the present invention to provide an information processing system, an information processing method, and an information processing program that are capable of controlling display of a target content item while flexibly adapting to a display duration that changes in accordance with operations performed by a visitor so that the visitor can understand the display content of the target content item even when the display duration is short.

According to an exemplary embodiment, the disclosure is directed to an information processing system that calculates an estimated display duration for which a content item will be displayed on a page displayed by a display of an electronic device; determines an amount of content to be included in the content item, wherein the determining includes reducing an amount of content included in the content item in a case that the estimated display duration is less than a predetermined threshold value; and causes the content item to be displayed on the page displayed by the display of the electronic device based on the determining.

Advantageous Effects

Embodiments of the present disclosure make it possible to control display of a target content item while flexibly adapting to a display duration that changes in accordance with operations performed by a visitor so that the visitor can understand the display content of the target content item even when the display duration is short.

Embodiments of the present disclosure also make it possible to reduce processing loads, quickly change the content amount of the target content item, and cause the target content item to be displayed. For example, a target content item with a smaller content amount of display content but corresponding to the display content of a target content item previously displayed can be displayed. This reduction in processing load also addresses the problem noted above by increasing the speed at which the reduced-size content would be available for display to the user. Thus, since the content can be displayed more quickly, the chances of a user quickly changing the display (e.g. by a scrolling or page turning operation) before the content has been displayed are reduced.

Embodiments of the present disclosure also make it possible to accurately estimate a display duration that is close to an actual display duration.

Embodiments of the present disclosure also make it possible to control display of a target content item while flexibly adapting to a display duration that changes in accordance with operations performed by a visitor so that the visitor can understand the display content of the target content item even when the display duration is short and the visitor has a high level of interest in another content item displayed together with the target content item.

BRIEF DESCRIPTION OF DRAWINGS

FIG. 2A is a block diagram schematically showing an example configuration of a content providing server 1 according to this embodiment;

FIG. 2B is a block diagram schematically showing an example configuration of a client terminal 2 according to this embodiment;

FIG. 2C is a diagram showing example functional blocks in a system controller 14 or a system controller 26;

FIG. 6 is a flowchart showing an example of a content display process performed by the system controller 26 of the client terminal 2.

DESCRIPTION OF EMBODIMENTS

The following describes an embodiment of the present invention with reference to the drawings. In the embodiment described below, the present invention is applied to a content display system.

1. Configuration and Functional Overview of Content Display System

Figure 1:
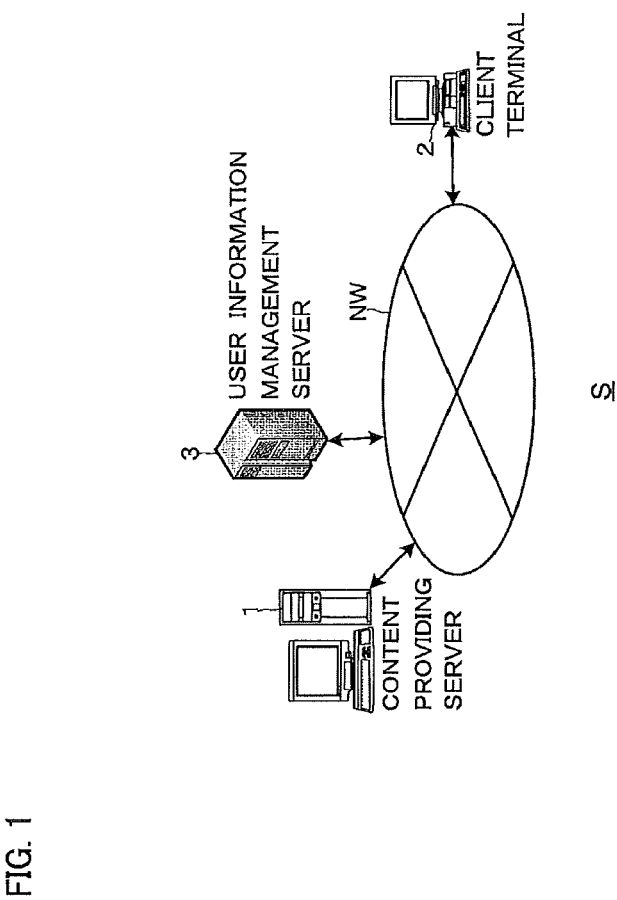
FIG. 1 is a diagram schematically showing an example configuration of a content display system S according to this embodiment.

First, a configuration and a functional overview of a content display system S according to this embodiment is described with reference to FIG. 1. FIG. 1 is a diagram schematically showing an example configuration of the content display system S according to this embodiment. As shown in FIG. 1, the content display system S includes a content providing server 1, a client terminal 2, and a user information management server 3. The content display system S is an example of an information processing system according to the present invention. The content providing server 1, the client terminal 2, and the user information management server 3 are connected to a network NW. The network NW includes, for example, the Internet, a dedicated communication line (e.g., community antenna television (CATV) line), a mobile communication network (including base stations), and a gateway. The user information management server 3 may be integrated into the content providing server 1. The functions of the user information management server and the content providing server may also be provided in a distributed cloud-based computing environment that includes a plurality of servers.

The content providing server 1 is a server that provides a website, such as a shopping site, an auction site, a travel reservation site, a lodging reservation site, a facility reservation site, a blog site, and social networking service (SNS) site. Although pages (web pages) that are provided from the content providing server 1 (website) to the client terminal 2 and then displayed are taken as an example in this embodiment, pages that are displayed by an application installed on the client terminal 2 may be used. The pages that are provided from the website are made up with structured document data, such as hypertext markup language (HTML) documents and XHTML documents, image data, and other data. When the URL of the website is specified through a browser, the client terminal 2 displays a corresponding page provided from the website on a display screen (i.e., a visitor's screen) that appears on its display. This display screen means an active display area (also referred to as a frame), such as a window of the browser.

Such a page contains a plurality of areas, including a display area for displaying a content item (hereinafter, simply a "content display area"). A single page sometimes contains a plurality of content display areas. Each content display area is assigned an area ID unique to itself (identification information identifying the area). Content is displayed being embedded in a page on a visitor's screen. The content is made up with at least either image data or text data, and displayed as a planar-sized object falling within a content display area. The content includes, but are not limited to, articles and news posted by, for example, a website operator and a website organizer (e.g., a blogger) or information that introduces items to be transacted and information that introduces tourist sites. The content may include electronic book content. For example, the articles include some of the name (trade name), the type, the price, attributes, features, item identification information (e.g., the item ID or the item code), and other information of an item that the website organizer introduces, and reviews (e.g., impressions, opinions, comments, and evaluations) on the item. The content is stored, for example, in the content providing server 1. There are cases where, for example, a link (hyperlink) to a website that provides detailed information about transaction objects and a link to a website that processes orders for transaction objects are set in content displayed in a content display area. The size of a page (the total area of a page) is larger (wider) than the size of the display screen of the client terminal 2. Thus, part of the entire page is displayed on the display screen, and the area displayed on the display screen moves in accordance with an operation (e.g., a "scroll" operation, a "page down" operation, or a "page down" operation) performed by a visitor of the page. Some pages contain a tag that is embedded therein to classify and search for information treated therein. Each tag includes, for example, an item category, current topics (events) and a genre.

The user information management server 3 is a server that manages user information about users of the client terminals 2. The users of the client terminals 2 will be visitors of pages to be provided from the website. The user information management server 3 includes a user information database that stores user information including each user's user ID (identification information identifying the user), password, gender, age, preference information, contact address (e.g., email address), search history, viewing history, bookmark history, and purchase history. The user ID and the corresponding password are authentication information required for the user to log in to the system. Examples of the preference information include item categories that the user has an interest in or a concern for, current topics that the user has an interest in or a concern for, and genres (e.g., sports, business, economy, art, and technology) that the user has an interest in or a concern for. Item categories are used to categorize items, for example, broadly into home appliances, food, fashion, interior decoration, and books. The home appliances are further categorized, for example, into televisions, audio equipment, personal computers, and cameras. The cameras are further categorized, for example, into single-lens reflex cameras and compact cameras.

Each user's preference information may be stored in the user information database in response to a registration request from the client terminal 2 that has accessed the user information management server 3, or may be obtained from the results of a questionnaire survey conducted on a predetermined website. Alternatively, each user's preference information may be identified based on at least one of the following histories: the user's search history, viewing history, bookmark history, and purchase history, and be updated at appropriate times. The search history includes search queries, corresponding search dates, and other information in association with each other. Each search query includes one or more words. Each search date may include a year, month, date, and time. The viewing history includes information displayed on pages viewed by the user, view dates, and other information in association with each other. Examples of information displayed on each page include the item categories of an item, current topics, and the genre of the information. The bookmark history includes the names and item identification information (e.g., the item ID or the item code) of bookmarked items, and corresponding bookmark dates, and other information in association with each other. The purchase history includes the names and item identification information (e.g., the item ID or the item code) of purchased items, and corresponding purchase dates, and other information in association with each other. These histories are obtained using a user ID as a key from not only the website provided by the content providing server 1 but also various websites including a search site at a predetermined time by the user information management server 3, and then stored in the user information database.

FIG. 2A is a block diagram schematically showing an example configuration of the content providing server 1 according to this embodiment. As shown in FIG. 2A, the content providing server 1 includes, for example, a communication interface 11, storage 12, an input/output interface 13, and a system controller 14. The system controller 14 and the input/output interface 13 are connected via a system bus 15. The communication interface 11 connects to the network NW and controls the state of communications. The storage 12 includes, for example, hard disk drives. The storage 2 stores various programs, such as an operating system (OS) and server programs. The storage 12 is an example of storage means for storing content items. The storage 12 is provided with a storage area corresponding to the website. The storage area stores the URL of the website, data including structured documents that make up each page, and information about a content display area placed on the page. The information about the content display area includes, for example, the area ID of the content display area and a content item to be displayed in the content display area. When a page contains a plurality of content display areas, the storage area stores, for each of the content display areas, information about the content display area. Data including structured documents that make up a page and information about a content display area placed on the page are sent to the client terminal 2 in response to a page request from the client terminal 2. The system controller 14 includes, for example, a central processing unit (CPU) 14a (processor), a read only memory (ROM) 14b, and a random access memory (RAM) 14c. The system controller 14 performs processes to be described later.

FIG. 2B is a block diagram schematically showing an example configuration of the client terminal 2 according to this embodiment. As shown in FIG. 2B, the client terminal 2 includes, for example, a user interface 21, a display 22, a communication interface 23, storage 24, an input/output interface 25, and a system controller 26. The system controller 26 and the input/output interface 25 are connected via a system bus 27. The user interface 21 includes, for example, a keyboard and a mouse. The display 22 has a display screen for displaying the above pages. A touch screen that doubles as the user interface 21 and the display 22 may be used. The communication interface 23 connects to the network NW and controls the state of communications. The storage 24 includes, for example, hard disk drives. The storage 24 stores various programs, such as an operating system (OS), applications, and a browser. The system controller 26 includes, for example, a CPU 26a (processor), a ROM 26b, and a RAM 26c. The system controller 26 performs processes to be described later. For example, a terminal device, such as a personal computer (PC), a mobile phone, a personal digital assistant (PDA), a handheld device (smartphone) that is a mobile phone integrated with a personal digital assistant, or a handheld game console, can be used as the client terminal 2.

In the above configuration, the system controller 14 or the system controller 26 as a computer performs a content display process to be described later, in accordance with an information processing program according to the present invention. The system controller 14 or the system controller 26 is capable of accessing storage for storing content items. The information processing program is downloaded from, for example, a predetermined server over the network NW and then stored in the storage 12 or the storage 24. Alternatively, the information processing program may be stored in a (computer-readable) recording medium, such as a compact disc (CD) or a digital versatile disc (DVD), and be read from the recording medium into the storage 12 or the storage 24.

FIG. 2C is a diagram showing example functional blocks in the system controller 14 or the system controller 26. In the above content display process, the system controller 14 (the processor in the system controller 14) or the system controller 26 (the processor in the system controller 26) functions as, for example, a target content identification unit 101, a display duration estimator 102, an interest level calculator 103, a content amount updater 104, and a display controller 105, as shown in FIG. 2C. The display duration estimator 102 is an example of estimating means of the present invention. The content amount updater 104 is an example of changing means of the present invention. The display controller 105 is an example of display control means of the present invention.

While a page is being displayed on the display screen of the client terminal 2, the target content identification unit 101 identifies, as a target content item, a content item that is in a content display area placed on the page but is not being displayed on the display screen. When a plurality of content items are not being displayed on the display screen, each content item may be identified as a target content item, or one of the content items (e.g., a content item placed at a position displayed first on the display screen) may be identified as a target content item.

The display duration estimator 102 estimates a display duration for which the target content item will remain displayed on the display screen. For example, the display duration estimator 102 determines how long the target content item, which is not being displayed on the display screen, is estimated to remain displayed (in other words, exposure duration) assuming that the target content item will be displayed on the display screen in accordance with an operation (e.g., a "scroll" operation, a "page down" operation, or a "page down" operation) performed by a visitor of the page. The estimated display duration indicates the length of time from when the target content item currently not yet being displayed on the display screen appears on the display screen (i.e., from when the target content item moves into the frame) to when the target content item moves (disappears) out of the display screen (i.e., to when the target content item moves out of the frame). For example, the display duration estimator 102 estimates the display duration, based on the speed (e.g., the moving speed such as the scrolling speed) at which the page moves in accordance with an operation performed by the visitor of the page and on the size of the display screen (i.e., the size of the display screen in the moving direction such as the scrolling direction). This makes it possible to accurately estimate a display duration that is close to an actual display duration. Movement of the page means, for example, that the page slides. Examples of "slide" include "scroll", "page down", and "page up".

Figure 3C:
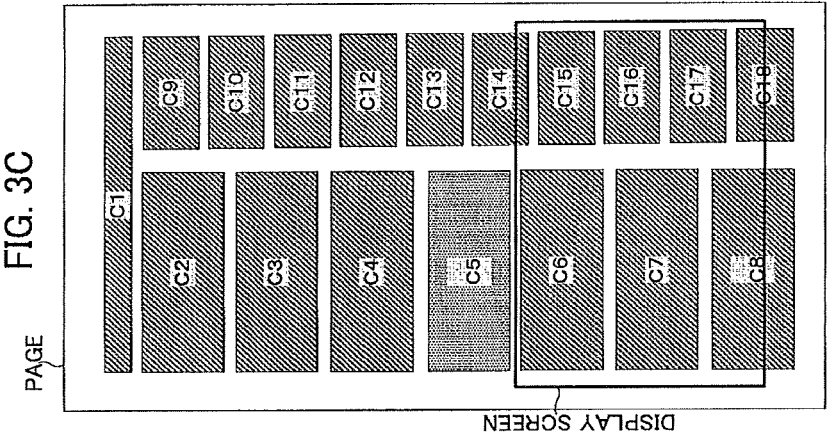
FIGS. 3A to 3C are each a diagram showing an example relationship between a page being scrolled through and the display screen.
Figure 3B:
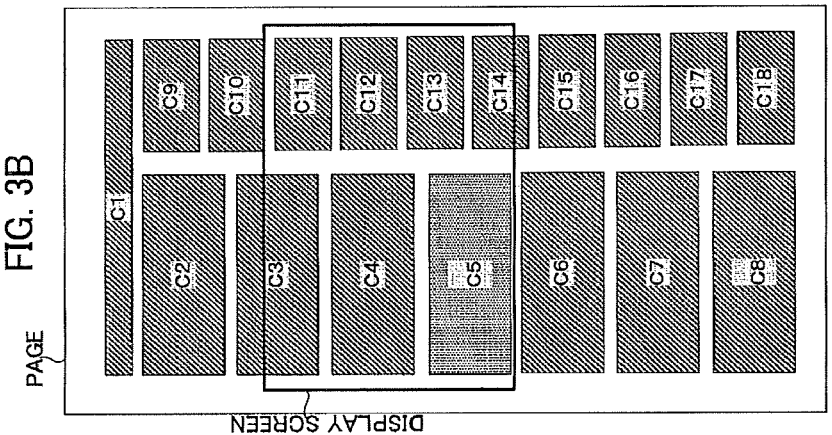
Figure 3A:
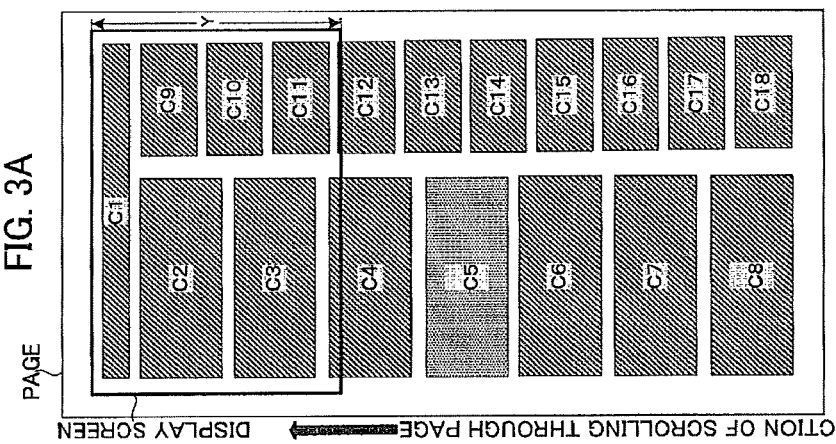

FIGS. 3A to 3C are each a diagram showing an example relationship between a page being scrolled through and the display screen. Assume in the examples of FIGS. 3A to 3C that the page contains content items C1 to C18, each of which is placed in a corresponding content display area, and that the content item C5 is identified as a target content item. In the example of FIG. 3A, the target content item C5 is not displayed on the display screen. In the example of FIG. 3B, the target content item C5 appears and is displayed on the display screen. In the example of FIG. 3C (at a future time), the target content item C5 is outside the display screen. Here, assuming that the scrolling speed (e.g., the average speed, the maximum speed, or the minimum speed) of the page is X mm/sec and that the size of the display screen in the scrolling direction (the height, in the examples of FIGS. 3A to 3C) is Y mm, an estimated display duration is calculated to be the value obtained by dividing the display screen size of Y by the scrolling speed of X. In this manner, the estimated display duration can be considered to be the total time while the target content item C5 remains displayed (exposed). The estimated display duration can be said to be the duration for which a visitor can keep up interest in the target content item C5. The acceleration of a scrolling operation may also be taken into account when estimating the display duration. For example, if the acceleration of the scrolling operation is increasing as target content item C5 is displayed an adjustment factor may be applied to the scrolling speed to decrease the estimated display duration. On the other hand, if the acceleration of the scrolling operation is decreasing as target content item C5 is displayed an adjustment factor may be applied to the scrolling speed to increase the estimated display duration.

The display duration estimator 102 may identify the duration for which another content item (e.g., the content item C2 shown in FIG. 3A) than the target content item has been displayed on the display screen in accordance with an operation performed by the visitor of the page, to estimate the display duration. This duration indicates how long the other content item was actually displayed on the display screen (i.e., the length of time measured from when the other content item appeared on the display screen to when the other content item moved out of the display screen). For example, when the page on the display screen slides in accordance with an operation performed by the visitor and then a target content item is displayed, the display duration estimator 102 identifies the display duration for which another content item has been displayed being embedded in the page on the display screen and estimates, based on the identified display duration, a display duration for which the target content item will remain displayed on the display screen. For example, the identified display duration is estimated to be the display duration of the target content item. Alternatively, the duration obtained by adding a hours to the identified display duration maybe estimated to be the display duration of the target content item.

As another example, when a series of pages are displayed one after another in accordance with an operation performed by a visitor, the display duration estimator 102 may identify the display duration for which another content item has been displayed being embedded in a page displayed earlier on the display screen and estimate, based on the identified display duration, a display duration for which a target content item will remain displayed being embedded in a page to be displayed later (a subsequent page) on the display screen. Example of a series of pages include a plurality of web pages that constitute one article. When a next page button on a web page displayed earlier among such a plurality of web pages is clicked (or tapped) by a visitor, a web page subsequent to the web page displayed earlier is displayed. The above-described estimation methods make it possible to more accurately estimate a display duration that is close to an actual display duration. Another content item than the target content item may be a content item that is highly related to the target content item. Examples of the other content item include a content item including the same keyword as or a keyword related to the target content item, a content item including the same tag as or a tag related to the target content item, and a content item belong to the same category or genre as or a category or genre related to the target content item.

The target content item is not limited to a content item that is displayed after sliding, such as scrolling. The target content item may be a content item that is placed on the top of the page and displayed as soon as the page is displayed. For example, assume that an article as a content item is placed at the top of a page presented in a fixed format, such as a news page, and that the page containing another article but presented in the format has been viewed several times by a visitor. In this case, for example, the scrolling speed of the content item at the top of the page and the display duration of the content item are stored in the visitor's viewing history. When such a content item is identified as a target content item, the display duration estimator 102 retrieves a visitor's viewing history on the target content item and estimates the display duration included in the retrieved viewing history or a display duration calculated from the scrolling speed included in the retrieved viewing history to be the display duration for which the target content item will remain displayed on the display screen.

The higher level of interest in the target content item a visitor of the page has, the shorter the display duration estimator 102 may estimate the above display duration to be. This makes it possible to estimate a display duration to present the target content item more effectively. The higher level of interest in the target content item the visitor of the page has, the shorter the above display duration is made. This aims to reduce the content amount of the target content item to an amount that enables the visitor to understand the target content item. Consequently, this makes it possible to present a target content item that is easy for a visitor to understand at a glance. In this case, the interest level calculator 103 retrieves the preference information of the visitor of the page, for example, from the user information management server 3 (using the user ID of the visitor as a key). Based on the retrieved preference information, the interest level calculator 103 calculates the visitor's level of interest in the target content item. For example, the interest level calculator 103 searches information included in the target content item for an item category, a current topic, or a genre that is indicated by the visitor's preference information. The larger the number of hits obtained in the search is, the higher the interest level calculator 103 calculates the visitor's level of interest to be. For example, if the number of the hits is 0, the level of interest is set to 1. If the number of the hits is greater than or equal to 1 but less than 5, the level of interest is set to 2. If the number of the hits is greater than or equal to 5 but less than 10, the level of interest is set to 3. In this case, for example, the display duration estimator 102 multiplies the above (temporarily) estimated display duration by a coefficient that decreases with increase in the level of interest to estimate (i.e., modify and finally estimate) the display duration. For example, the coefficient is 1 when the level of interest is 1, the coefficient is 0.9 when the level of interest is 2, and the coefficient is 0.8 when the level of interest is 3.

The nearer to each other on the page the target content item and another content item that is displayed earlier than the target content item and in which the visitor has a relatively high level of interest are (the shorter the distance between them is), the shorter the display duration estimator 102 may estimate the display duration to be. This makes it possible to estimate a display duration to present the target content item more effectively. The nearer to each other on the page the target content item and the other content item in which the visitor has a relatively high level of interest are, the shorter the above display duration is made. This aims to reduce the content amount of the target content item to an amount that enables the visitor to understand the target content item. Consequently, this makes it possible to present a target content item that is easy for a visitor to understand at a glance, even if another content item in which the visitor has a relatively high level of interest is displayed earlier. In this case, the interest level calculator 103 retrieves the preference information of the visitor of the page, for example, from the user information management server 3. Based on the retrieved preference information, the interest level calculator 103 calculates the visitor's level of interest in the target content item and the visitor's level of interest in the other content item displayed earlier than the target content item. The level of interest in this case is calculated in the same manner as above. The display duration estimator 102 then compares, for example, the visitor's level of interest in the other content item with the visitor's level of interest in the target content item. If the visitor's level of interest in the other content item is greater than or equal to (or higher than) the visitor's level of interest in the target content item, the display duration estimator 102 multiplies the above estimated display duration by a coefficient that decreases with decrease in the distance between the other content item and the target content item on the page (e.g., the distance between the central coordinates of the corresponding content display areas) to estimate (modify) the display duration. For example, the coefficient is 0.8 when the distance is less than 1, the coefficient is 0.9 when the distance is greater than or equal to 1 but less than 2, and the coefficient is 1 when the distance is greater than or equal to 2 but less than 3.

When there are a plurality of other content items displayed earlier than the target content item, the visitor's level of interest in each of the other content items is calculated, and the other content item in which the visitor has, for example, the highest level of interest is selected from among the other content items. In this case, the display duration estimator 102 compares the visitor's level of interest in the selected other content item with the visitor's level of interest in the target content item. If the visitor's level of interest in the selected other content item is greater than or equal to (or higher than) the visitor's level of interest in the target content item, the display duration estimator 102 multiplies the above estimated display duration by a coefficient that decreases with decrease in the distance between the selected other content item and the target content item on the page to estimate (modify) the display duration. Alternatively, when there are a plurality of other content items displayed earlier than the target content item, the display duration estimator 102 compares the visitor's level of interest in each of the other content items with the visitor's level of interest in the target content item. If more than a predetermined percentage (e.g., half) of the visitor's levels of interest in the other content items are greater than or equal to (or higher than) the visitor's level of interest in the target content item, the shorter the distances among those other content items on the page are (i.e., the nearer to each other the display positions of the other content items are), the shorter the display duration estimator 102 may estimate (modify) the display duration of the target content item to be. Alternatively, the display duration may be modified depending on whether the visitor's levels of interest in a plurality of other content items displayed near each other are relatively high or low.

The more other content items are displayed on the display screen around the same time as the target content item whether the visitor's level of interest is high or not, the shorter the display duration estimator 102 may estimate the display duration to be. This makes it possible to estimate a display duration to present the target content item more effectively. The more other content items are displayed on the display screen around the same time as the target content item, the shorter the above display duration is made. This aims to reduce the content amount of the target content item to an amount that enables the visitor to understand the target content item. Consequently, this makes it possible to present a target content item that is easy for a visitor to understand at a glance, among many displayed content items. In this case, the display duration estimator 102 counts the number of other content items located (e.g., the corresponding content display areas whose central coordinates are located) within a predetermined range (e.g., a range corresponding to the size of the display screen) around the target content item. The display duration estimator 102 then multiplies the above estimated display duration by a coefficient that decreases with increase in the counted number of other content items to estimate (modify) the display duration. For example, the coefficient is 1 when the number of the content items is less than 5, the coefficient is 0.9 when the number of the content items is greater than or equal to 5 but less than 10, and the coefficient is 0.8 when the number of the content items is greater than or equal to 10. The larger the content display areas for the other content items displayed on the display screen around the same time as the target content item are, the shorter the display duration estimator 102 may estimate the display duration of the target content item to be. In this case, the display duration estimator 102 calculates the proportion of the content display areas for the other content items in the display range. The display duration estimator 102 then multiplies the above estimated display duration by a coefficient that decreases with increase in the calculated proportion of the content display areas to estimate (modify) the display duration. For example, the coefficient is 1 when the proportion is less than 10%, the coefficient is 0.9 when the number of the content items is 10% or more but less than 30%, and the coefficient is 0.8 when the number of the content items is 30% or more.

The content amount updater 104 updates the above target content item, based on the display duration estimated by the display duration estimator 102. More specifically, if the display duration estimated by the display duration estimator 102 is shorter than a preset threshold value, the content amount updater 104 reduces the content amount of the target content item to be displayed on the display screen to an amount that enables the visitor to understand the target content item within the display duration. This makes it possible to narrow down to points important for the visitor to understand. The content amount of the target content item means what amount the visitor visually understands on the display screen, and does not necessarily correspond to the amount of data (e.g., the size of the data (byte)) on the system. That is, in some cases, by adding image data to a target content item, the content amount of the target content item is reduced to an amount that enables the visitor to understand the target content item, whereas the data size of the target content item increases. As an indicator of the content amount of the target content item, for example, the number of entries, such as the trade name, the price, and item specifications of an item introduced by the target content item, can be used. The nearer to each other on the page the target content item and the other content item in which the visitor has a relatively high level of interest are, the more the content amount updater 104 may reduce the content amount of the target content item. The higher level of interest in another content item displayed together with the target content item the visitor of the page has, the more the content amount updater 104 may reduce the content amount of the target content item.

However, some benefits may also be realized by reducing the amount of data (e.g., the size of the data (byte)) displayed to the user. This allows or a reduction in bandwidth and/or processing load required to make the display content available to the user, thereby increasing the speed at which this content may be presented to the user. This reduction in the amount of data (e.g., the size of the data (byte)) may be achieved by deteriorating the content in some way (e.g. reducing a resolution of the image) or by reducing the amount of content actually included in the target content item.

When the display duration estimator 102 estimates the display duration, the content amount updater 104 may reduce the content amount of the target content item to an amount that enables the visitor to understand the target content item in real time, in accordance with a predetermined criterion. In this case, for example, the content amount updater 104 reduces the number of characters included in the target content item, the size of an image included in the target content item, or adds an image to the target content item. However, the content amount updater 104 preferably selects a target content item corresponding to the display duration estimated by the display duration estimator 102 to change the content amount of a target content item set as default, by referring to a relational table prepared for each content display area (area ID) (e.g., for each of the content display areas in which the corresponding content items C1 to C18 shown in FIG. 3 are placed). In this case, the storage unit 12 stores a content set including a plurality of target content items that are mutually related in display content but mutually different in content amount. Each of the target content items included in this content set is stored in association with a display duration that enables the visitor to understand the display content of the target content item by the relational table. The content amount updater 104 identifies the target content item associated with the display duration estimated by the display duration estimator 102 as a target content item to be displayed on the display screen, from the stored content set, to reduce the content amount of the target content item to an amount that enables the visitor to understand the target content item. This makes it possible to reduce processing loads, quickly change the content amount of the target content item, and cause the target content item to be displayed. For example, a target content item with a smaller content amount of display content but corresponding to the display content of a target content item previously displayed can be displayed.

Figure 4A:
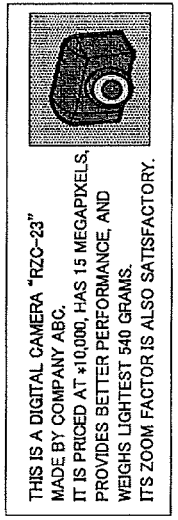
FIGS. 4A to 4D are each a conceptual diagram illustrating an example of identifying which a target content item corresponds to an estimated display duration.
Figure 4B:
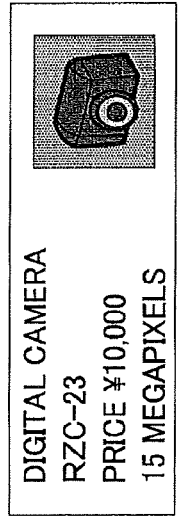
Figure 4C:
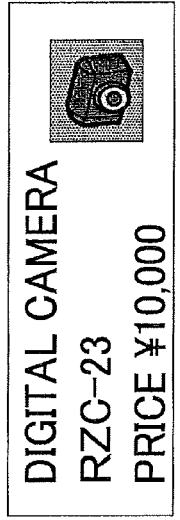
Figure 4D:
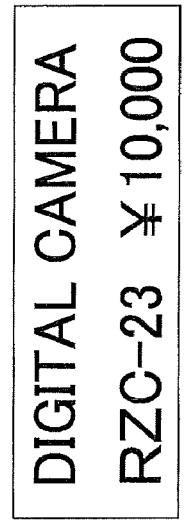

FIGS. 4A to 4D are each a conceptual diagram illustrating an example of identifying which a target content item corresponds to an estimated display duration. In the examples illustrated in FIGS. 4A to 4D, a plurality of display durations (display time ranges) are associated one-to-one with a plurality of target content items that are mutually related in display content but mutually different in content amount by the relational table. For example, a target content item is preferably defined in a structured document that makes up a page, so as to be placed as an inline frame on the page. The display duration (10 seconds or more) shown in FIG. 4A is associated with a target content item having the largest number of characters as its content amount (e.g., a target content item set as default). The display duration (5 seconds or more, but less than 10 seconds) shown in FIG. 4B is associated with a target content item obtained by subtracting a predetermined number of characters from the characters in the target content item shown in FIG. 4A (whose font size is increased accordingly). The display duration (1 second or more, but less than 5 seconds) shown in FIG. 4C is associated with a target content item obtained by further subtracting a predetermined number of characters from the characters in the target content item shown in FIG. 4B (whose font size is increased accordingly) and also by reducing the size of an image. The display duration (less than 1 second) shown in FIG. 4D is associated with a target content item obtained by further subtracting a predetermined number of characters from the characters in the target content item shown in FIG. 4C (whose font size is increased accordingly) and also by deleting the image (i.e., the image is deleted because it is unlikely to be understand even if being displayed). In this case, from a prepared content set including a plurality of target content items that are mutually related in display content but mutually different in content amount as shown in FIGS. 4A to 4D, the content amount updater 104 selects the target content item associated with an estimated display duration (i.e., corresponding to the display time range including the display duration), and then embeds and places it in a page, to reduce the content amount of a target content item set as default to an amount that enables the visitor to understand the target content item. If the target content item set as default is identified, the content amount of the target content item is not changed.

When the target content item includes a plurality of entries, such as a trade name, a price, and item specifications, each of the entries is stored in association with a display duration that enables the visitor to understand the display content of the entry. For example, each of the above display durations (display time ranges) is associated with a mutually different number of entries. Each entry is classified according to genre, each classified genre may be associated with a priority. Based on the entry(ies) associated with the display duration estimated by the display duration estimator 102, the content amount updater 104 removes some of the entries included in the target content item for which the display duration has been estimated, to reduce the content amount of the target content item to be displayed on the display screen to an amount that enables the visitor to understand the target content item. This makes it possible to reduce processing loads, automatically generate a reduced content amount of target content item, and cause the target content item to be displayed. For example, the content amount updater 104 removes some of the entries included in the target content item so that the number of entries included in the target content item becomes equal to the number of entries associated with the estimated display duration, to reduce the content amount of the target content item to be displayed on the display screen to an amount that enables the visitor to understand the target content item. When each entry is associated with a priority, it is preferable that the content amount updater 104 preferentially remove an entry of relatively low priority, among the entries included in the target content item. In other words, it is preferable that the content amount updater 104 preferentially keep an entry of relatively high priority, among the entries included in the target content item.

In the example of FIG. 4, the content amount updater 104 changes information about the target content item without changing the display size of the content display area for the target content item. In this example, the content amount updater 104 reduces the number of characters, increases the font size, reduces an image, and deletes the image. That is, the content amount updater 104 changes the content amount of the target content item without changing the page layout. This makes it possible to reduce the processing load, quickly update the content amount of the target content item, and cause the target content item to be displayed. As another example, the content amount updater 104 may change (increase or reduce) the display size of the content display area for the target content item to conform it the content amount of the changed target content item. This makes it possible to update the display size of the content display area so that it fits the changed content amount (the content amount of the target content item). Alternatively, the content amount updater 104 may change (increase or reduce) the display size of the target content item. This makes it possible to quickly update the content amount of the target content item and cause the target content item to be displayed. Alternatively, based on the difference between a reference display duration predetermined for each target content item and the estimated display duration, the content amount updater 104 may change the content amount of the target content item by increasing or reducing it by a content amount corresponding to the difference. In this case, for example, each of a plurality of predivided difference ranges is associated with a content amount (e.g., the number of characters or an image size). The content amount updater 104 selects the content amount corresponding to the difference range including the difference between the estimated display duration and the reference display duration, and the content amount of the target content item set as default based on the selected content amount.

Figure 5A:
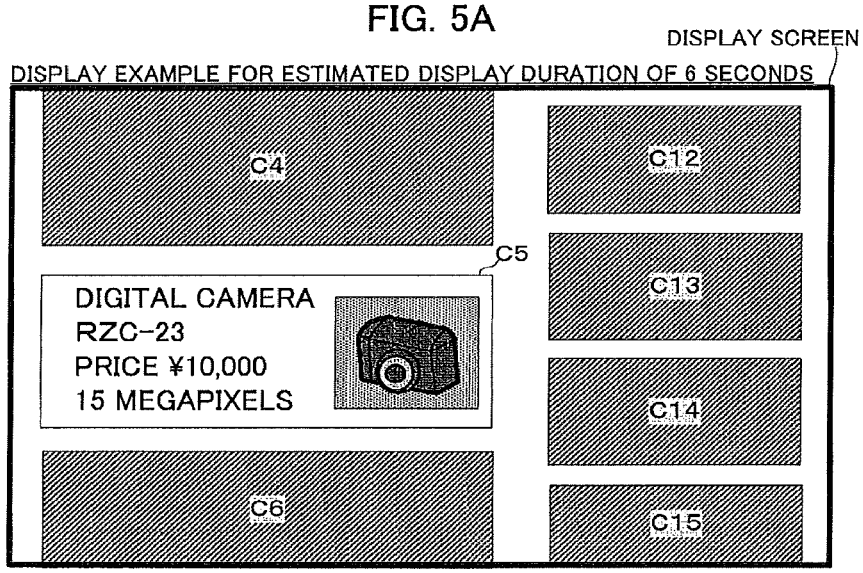
FIGS. 5A and 5B are diagrams showing an example display screen on which a target content item whose content amount has been changed is displayed being embedded in a page.
Figure 5B:
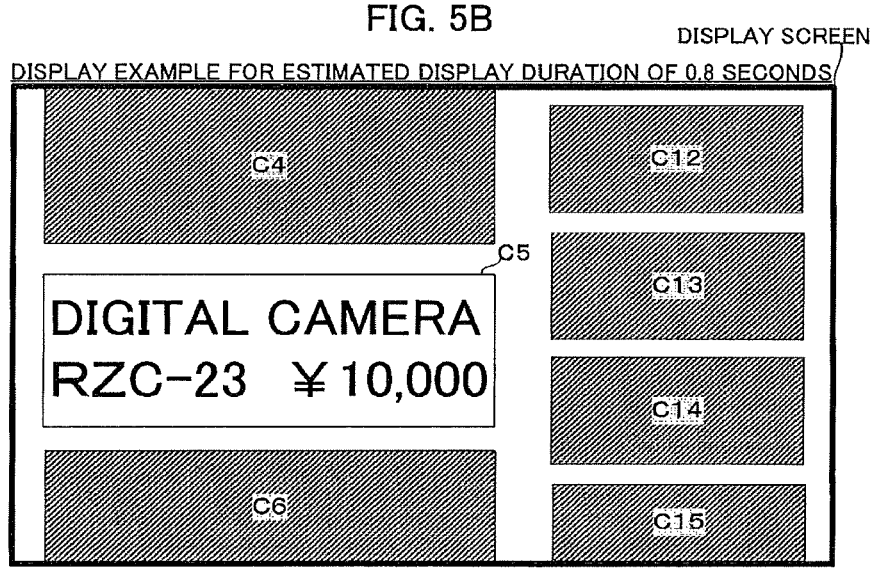

For example, in response to an operation performed by the visitor of the page or in response to an automatic scrolling of the page triggered by an operation performed by the visitor of the page, the display controller 105 causes the target content item whose content amount has been updated by the content amount updater 104 to be displayed being embedded in the page on the display screen. FIGS. 5A and 5B are diagrams showing an example display screen on which a target content item whose content amount has been changed is displayed being embedded in a page. FIG. 5A shows an example of how the target content item C5 is displayed when the display duration estimated by the display duration estimator 102 is 6 seconds. FIG. 5B shows an example of how the target content item C5 is displayed when the display duration estimated by the display duration estimator 102 is 0.8 second. As can be seen from a comparison between FIG. 5A and FIG. 5B, the shorter the display duration is, the less amount, which enables the visitor to understand the target content item, the content amount of the target content item is reduced to. This makes it possible to control display of the target content item while flexibly adapting to the display duration that changes in accordance with operations performed by the visitor so that the visitor can understand the display content of the target content item even when the display duration is short.

2. Content Display System Process

The following describes how the content display system S according to this embodiment operates with reference to FIG. 6. FIG. 6 is a flowchart showing an example of the content display process performed by the system controller 26 of the client terminal 2. The content display process is performed by the system controller 26, for example, in accordance with a program (script) written in a structured document for a page. The system controller 26 of the client terminal 2 accesses the content providing server 1 to send a page request, based on the URL of a website specified through the browser in accordance with an operation performed by a visitor of the page. The content providing server 1 (the website) provides a page to the client terminal 2.

When obtaining the page from the content providing server 1, the system controller 26 of the client terminal 2 starts the content display process shown in FIG. 6. The content display process shown in FIG. 6 may be started after the client terminal 2 has made a login request to the content providing server 1 and the user of the client terminal 2 (i.e., the visitor of the page) has logged in to the content providing server 1. When the process shown in FIG. 6, the system controller 26 displays the obtained page on a display screen that appears on its display (Step S1).

Subsequently, the system controller 26 (the target content identification unit 101) identifies, as a target content item, a content item that is in a content display area placed on the page but is not being displayed on the display screen (Step S2). In this step, when a plurality of content items are not being displayed on the display screen, a plurality of target content items may be identified. However, assume in the example of FIG. 6 that one target content item is identified. Alternatively, the system controller 26 may send information indicating which part (e.g., coordinates) of the page is displayed on the display screen to the content providing server 1, and the system controller 14 of the content providing server 1 may identify, as a target content item, a content item that is in a content display area placed on the page but is not being displayed on the display screen.

Next, the system controller 26 determines whether the visitor has performed an operation to move the page (Step S3). If it determines that the visitor has not yet performed an operation to move the page (NO in Step S3), the system controller 26 causes the process to proceed to Step S4. On the other hand, if it determines that the visitor has performed an operation to move the page (YES in Step S3), the system controller 26 causes the process to proceed to Step S5.

In Step S4, the system controller 26 determines whether the visitor has performed an operation to end the display of the page. If it determines that the visitor has performed an operation to end the display of the page (YES in Step S4), the system controller 26 terminates the content display process. On the other hand, if it determines that the visitor has not yet performed an operation to end the display of the page (NO in Step S4), the system controller 26 causes the process to return to Step S3. In Step S5, the system controller 26 starts to move (e.g., scroll through) the page, in response to an operation to move the page.

Subsequently, in response to the operation performed by the visitor, the system controller 26 (the display duration estimator 102) estimates a display duration for which the target content item not displayed on the display screen will remain displayed on the display screen, as described above (Step S6). In this step, when the visitor has logged in, the system controller 26 (the interest level calculator 103) may retrieve the preference information of the visitor of the page from the user information management server 3 using the user ID of the visitor as a key. As described above, the system controller 26 may then calculate the visitor's level of interest in the target content item, based on the retrieved preference information. In this case, for example, the higher level of interest in the target content item the visitor of the page has, the shorter the system controller 26 (the display duration estimator 102) modifies the display duration to be. Alternatively, the nearer to each other on the page the target content item and another content item that is displayed earlier than the target content item and in which the visitor has a relatively high level of interest are, the shorter the system controller 26 modifies the display duration to be. Alternatively, the system controller 14 of the content providing server 1 may estimate the display duration.

Next, the system controller 26 determines whether the display duration estimated in Step S6 is shorter than the threshold value (Step S7). If it determines that the estimated display duration is shorter than the threshold value (YES in Step S7), the system controller 26 causes the process to proceed to Step S8. On the other hand, if it determines that the estimated display duration is not shorter than the threshold value (NO in Step S7), the system controller 26 causes the process to proceed to Step S9.

In Step S8, the system controller 26 (the content amount updater 104) reduces the content amount of the target content item to an amount that enables the visitor to understand the target content item within the estimated display duration, and then causes the process proceed to Step S9.

In Step S9, the system controller 26 determines whether the target content item is just about to enter the display screen. If it determines that the target content item is just about to enter the display screen (YES in Step S9), the system controller 26 causes the process to proceed to Step S11. On the other hand, if it determines that the target content item does not enter the display screen (NO in Step S9), the system controller 26 causes the process to proceed to Step S10.

In Step S10, the system controller 26 determines whether the page has stopped moving. If it determines that the page has not yet stopped moving (NO in Step S10), the system controller 26 causes the process to return to Step S9. On the other hand, if it determines that the page has stopped moving (YES in Step S10), the system controller 26 causes the process to return to Step S2.

In Step S11, the system controller 26 (the display controller 105) causes the target content item to be displayed being embedded in the page on the display screen. If the content amount of the target content item has been changed in Step S8, the target content item, whose content amount has been changed, is displayed being embedded in the page on the display screen. Alternatively, the system controller 14 of the content providing server 1 may cause the target content item, whose content amount has been changed, to be displayed on the display screen. For example, the system controller 14 sends data indicating the changed content amount to the browser of the client terminal 2 to cause the target content, whose content amount has been changed, to be displayed being embedded in the page on the display screen.

Subsequently, the system controller 26 determines whether the page has stopped moving (Step S12). If it determines that the page has not yet stopped moving (NO in Step S12), the system controller 26 causes the process to return to Step S11. On the other hand, if it determines that the page has stopped moving (YES in Step S12), the system controller 26 causes the process to return to Step S2.

As described above, according to the above embodiment, when a page is displayed on the display screen of the client terminal 2, the content display system S identifies, as a target content item, a content item that is in a content display area placed on the page but is not being displayed on the display screen. In response to an operation performed by a visitor of the page, the content display system S estimates a display duration for which the target content item will remain displayed. If the estimated display duration is shorter than a threshold value, the content display system S reduces the content amount of the target content item to an amount that enables the visitor to understand the target content item within the estimated display duration, and causes the target content item whose content amount has been changed to be displayed being embedded in the page on the display screen. This makes it possible to control display of the target content item while flexibly adapting to the display duration that changes in accordance with operations performed by the visitor so that the visitor can understand the display content of the target content item even when the display duration is short.

The invention claimed is:

1. An information processing system comprising:
   processing circuitry configured to
      calculate an estimated display duration for which a content item will be displayed on a page displayed by a display of an electronic device;
      determine an amount of display content to be included in the content item, wherein the determining includes reducing an amount of display content included in the content item in a case that the estimated display duration is less than a predetermined threshold value;
      cause the content item to be displayed on the page displayed by the display of the electronic device based on the determining
      determine a parameter based on stored information corresponding to a user's level of interest in the content item;
      determine a display duration of another content item displayed on the page prior to the content item being displayed;
      calculate the estimated display duration based on the parameter and the display duration of the other content item; and
      calculate the estimated display duration by multiplying the parameter with the display duration of the other content item.

2. The information processing system of claim 1, further comprising:
   a memory configured to store a set of display content that is related in display content but different in display content amount, wherein each of the display content included in the set is stored in association with a display duration.

3. The information processing system of claim 2, wherein the determining the amount of display content to be included in the content item includes accessing the memory to identify a display content item associated with the estimated display duration as the display content to be included in the content item to be displayed by the display of the electronic device.

4. The information processing system of claim 1, further comprising:
   a memory configured to store a plurality of entries corresponding to the content item, wherein each of the entries is associated with a corresponding display duration.

5. The information processing system of claim 4, wherein the reducing the amount of display content included in the content item includes omitting one or more of the entries corresponding to the content item based on the estimated display duration.

6. The information processing system of claim 1, wherein the parameter is a first value when the user's level of interest in the content item is greater than a second threshold value and a second value when the user's level of interest in the content items is less than the second threshold value, the first value being less than the second value.

7. The information processing system of claim 1, wherein the system is a server including a communication interface configured to transmit the page to be displayed by the electronic device over a network.

8. The information processing system of claim 1, wherein the system is the electronic device, which includes the display and a communication interface configured to receive information for displaying the page from at least a first server over a network.

9. The information processing system of claim 1, wherein the system is a plurality of servers each including a communication interface configured to exchange content via a network.

10. The information processing system of claim 1, wherein
reducing the amount of display content in the content item includes reducing the amount of display content to an amount that enables a viewer to comprehend the content item within the estimated display duration.

11. The information processing system of claim 1, wherein
reducing the amount of display content in the content item includes reducing a data size corresponding to the content item.

12. A method performed by an information processing system, the method comprising:
calculating an estimated display duration for which a content item will be displayed on a page displayed by a display of an electronic device;
determining an amount of display content to be included in the content item, wherein the determining includes reducing an amount of display content included in the content item in a case that the estimated display duration is less than a predetermined threshold value;
causing the content item to be displayed on the page displayed by the display of the electronic device based on the determining;
determining a parameter based on stored information corresponding to a user's level of interest in the content item;
determining a display duration of another content item displayed on the age prior to the content item being displayed;
calculating the estimated display duration based on the parameter and the display duration of the other content item; and
calculating the estimated display duration by multiplying the parameter with the display duration of the other content item.

13. The method of claim 12, wherein
the reducing includes selecting one subset of display content from a stored plurality of display content corresponding to the content item upon determining that the estimated display duration is less than the predetermined threshold value.

14. The method of claim 12, further comprising:
reducing the amount of display content to be included in the content item upon determining that the user's level of interest exceeds a second threshold value.

15. One or more non-transitory computer-readable media, including computer-program instructions, which when executed by an information processing system, cause the information processing system to:
calculate an estimated display duration for which a content item will be displayed on a page displayed by a display of an electronic device;
determine an amount of display content to be included in the content item, wherein the determining includes reducing an amount of display content included in the content item in a case that the estimated display duration is less than a predetermined threshold value;
cause the content item to be displayed on the page displayed by the display of the electronic device based on the determining;
determine a parameter based on stored information corresponding to a user's level of interest in the content item;
determine a display duration of another content item displayed on the page prior to the content item being displayed;
calculate the estimated display duration based on the parameter and the display duration of the other content item; and
calculate the estimated display duration by multiplying the parameter with the display duration of the other content item.

16. The one or more non-transitory computer-readable media of claim 15, wherein the computer-program instructions further cause the information processing system to:
reduce an amount of display content to be included in the content item when at least one of the following conditions is satisfied:
(1) the user's level of interest in the content item is less than a first threshold value; and
(2) the estimated display duration is less than a second threshold value.

* * * * *